(12) United States Patent
Reuveni (10) Patent No.: US 9,330,204 B2
(45) Date of Patent: May 3, 2016

(54) CAD SYSTEM AND METHOD FOR WIREFRAME COUPLING

(75) Inventor: Rami Reuveni, Irvine, CA (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 1850 days.

(21) Appl. No.: 12/617,247

(22) Filed: Nov. 12, 2009

(65) Prior Publication Data

US 2010/0302241 A1 Dec. 2, 2010

Related U.S. Application Data

(60) Provisional application No. 61/182,478, filed on May 29, 2009.

(51) Int. Cl.
*G06T 17/00* (2006.01)
*G06F 17/50* (2006.01)
*G06T 19/00* (2011.01)

(52) U.S. Cl.
CPC ............ *G06F 17/50* (2013.01); *G06T 19/00* (2013.01); *G06F 2217/06* (2013.01)

(58) Field of Classification Search
None
See application file for complete search history.

(56) References Cited

U.S. PATENT DOCUMENTS

| 5,844,563 | A | 12/1998 | Harada et al. |
| 6,571,146 | B1 | 5/2003 | Dennehy |
| 2003/0071810 | A1 | 4/2003 | Shoov et al. |
| 2003/0085889 | A1 | 5/2003 | Chin et al. |
| 2004/0153296 | A1* | 8/2004 | Landers et al. ............ 703/2 |
| 2004/0174383 | A1 | 9/2004 | Gurushankar et al. |
| 2004/0249809 | A1* | 12/2004 | Ramani et al. ............ 707/4 |
| 2010/0088429 | A1* | 4/2010 | Chu et al. ............ 709/246 |

FOREIGN PATENT DOCUMENTS

| JP | 2004-311272 A | 11/2004 |
| JP | 2005-502111 A | 1/2005 |
| JP | 2006-520505 A | 9/2006 |
| JP | 2007-129791 A | 5/2007 |
| JP | 2007-182540 A | 7/2007 |
| WO | 2004068300 A3 | 8/2004 |

OTHER PUBLICATIONS

David Watson, AutoCAD Tutorial—Basic 3D and Surface Modelling, Feb. 19, 2007 [Online][Retrieved on:Aug. 6, 2012][Retrieved from: http://web.archive.org/web/20070219074806/http://www.cadtutor.net/tutorials/autocad/basic-3d.php]: See attached pdf for 2007 archived version.*

(Continued)

*Primary Examiner* — Ulka Chauhan
*Assistant Examiner* — Sultana M Zalalee (57) ABSTRACT

Methods for use in a CAD system. One method includes loading CAD data, the CAD data including a first 2D wireframe geometry and a first 3D feature. The method also includes maintaining a first bi-directional logical relationship between the first 2D wireframe geometry and the first 3D feature and receiving an input of a change to the first 3D feature by the CAD system. The method also includes making the change to the first 3D feature and a corresponding change to the first 2D wireframe geometry by the CAD system using the first bi-directional logical relationship, in response to the input, and storing the changes. CAD systems and computer-readable mediums are also discussed.

21 Claims, 4 Drawing Sheets

(56) References Cited

OTHER PUBLICATIONS

Ault, H. K. (1999). 3-D geometric modeling for the 21st century. Engineering Design Graphics Journal, 63. (2), 33-42.*

Nemetschek AG. Neu in Allplan 2003, 2002 (p. 135); Magazine.

Blair, et al. Published in Collection of Technical Papers—AIAA/ASME/ASCE/AHS/ASC Structures, Structural Dynamics and Materials Conference 1996 AIAA, vol. 3, 1996 (pp. 1648-1658); Magazine.

Watson, David, "Basic 3D and Surface Modelling", http://web.archive.org/web/20070219074806/http://www.cadtutor.net/tutorials/autocad/basic-3 d.php (8 pages).

Chinese Office Action for Appl. No. 201080033004, dated Apr. 13, 2013 (23 pages).

Japanese Office Action mailed Jul. 8, 2013, for application No. 2012-513065.

* cited by examiner

CAD SYSTEM AND METHOD FOR WIREFRAME COUPLING

CROSS-REFERENCE TO OTHER APPLICATION

This application claims priority from U.S. Provisional Patent Application 61/182,478, filed May 29, 2009, which is hereby incorporated by reference.

TECHNICAL FIELD

The present disclosure is directed, in general, to computer-aided design, visualization, and manufacturing systems, and similar systems, referred to herein individually and collectively as "CAD systems."

BACKGROUND OF THE DISCLOSURE

Object models in CAD systems are typically represented using linear-history features or history-free features.

SUMMARY OF THE DISCLOSURE

Various disclosed embodiments include methods for use in a CAD system. One method includes loading CAD data, the CAD data including a first 2D wireframe geometry and a first 3D feature. The method also includes maintaining a first bi-directional logical relationship between the first 2D wireframe geometry and the first 3D feature and receiving an input of a change to the first 3D feature by the CAD system. The method also includes making the change to the first 3D feature and a corresponding change to the first 2D wireframe geometry by the CAD system using the first bi-directional logical relationship, in response to the input, and storing the changes. Embodiments including CAD systems and computer-readable mediums are also disclosed.

The foregoing has outlined rather broadly the aspects and technical advantages of the present disclosure so that those skilled in the art may better understand the detailed description that follows. Additional aspects and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments include a CAD system and related method and computer program product that can couple wireframe geometry with the feature geometry, typically face geometry, derived from the wireframe. These embodiments enable the wireframe geometry to remain in sync with subsequent operations that move feature geometry, and subsequent operations that modify the wireframe geometry cause the feature geometry to update. These embodiments produce a semblance of feature behavior in a system in the absence of a linear history that maintains a relationship between wireframe and feature geometry.

Feature geometry is often derived from and dependent on a corresponding wireframe geometry. In such cases, there is an associative relationship between the wireframe geometry and the feature geometry such that the wireframe geometry "drives" the feature geometry. This is particularly common in a linear-history CAD model, in which various features are associated with and dependent on a prior feature in the history tree for an object model. A linear history model maintains a feature order wherein the feature geometry is dependent on a prior wireframe geometry, so that, for example, the faces of a feature are defined by their relation to the wireframe geometry.

Some classes of features are derived from two-dimensional (2D) planar wireframe geometry, and the embodiments disclosed herein are particularly useful with such a class of features. These classes of features generally derive a volume from a 2D planar wireframe, and the CAD system then performs a Boolean operation using the volume as a tool to modify a target body.

For this class of feature, in general, the wireframe describes the 2D form such as profile or outline, and location of the feature. Other inputs in the feature recipe describe the third dimension of the three-dimensional (3D) feature, such as extent or depth. The wireframe is either embedded internal to the feature or external to the feature. The feature geometry typically means the faces of the feature, since the wireframe can define the edges, and reference the wireframe geometry as a prior feature in the history tree.

When the wireframe changes, the "downstream" features update such as the feature faces change accordingly. This directionality is a fundamental behavior of features in a conventional linear history model. When a user wishes to change the form or location of the feature, the user edits the wireframe, and the feature is updated accordingly. The user does not edit the face directly, since conventional systems cannot propagate any changes "up" the history tree to prior features or the wireframe.

History-free modeling differs in that it does not have linear history. In a history-free model, each local feature can reference the overall body itself instead of a prior feature in a history tree. Each feature face or wireframe can be directly edited individually, and does not affect any other feature. The corollary to this is that there is no automatic updating of related features as there is in a linear-history model. In particular, in a history-free model, a change to the wireframe geometry does not update the features, and a change to a specific feature still does not update to the wireframe geometry.

The systems and methods described herein enable a CAD system to maintain a relationship between a local feature and the wireframe geometry from which it is derived, even in the absence of a linear history, so that changes to either the local feature or the wireframe geometry are updated to the other.

Figure 1:
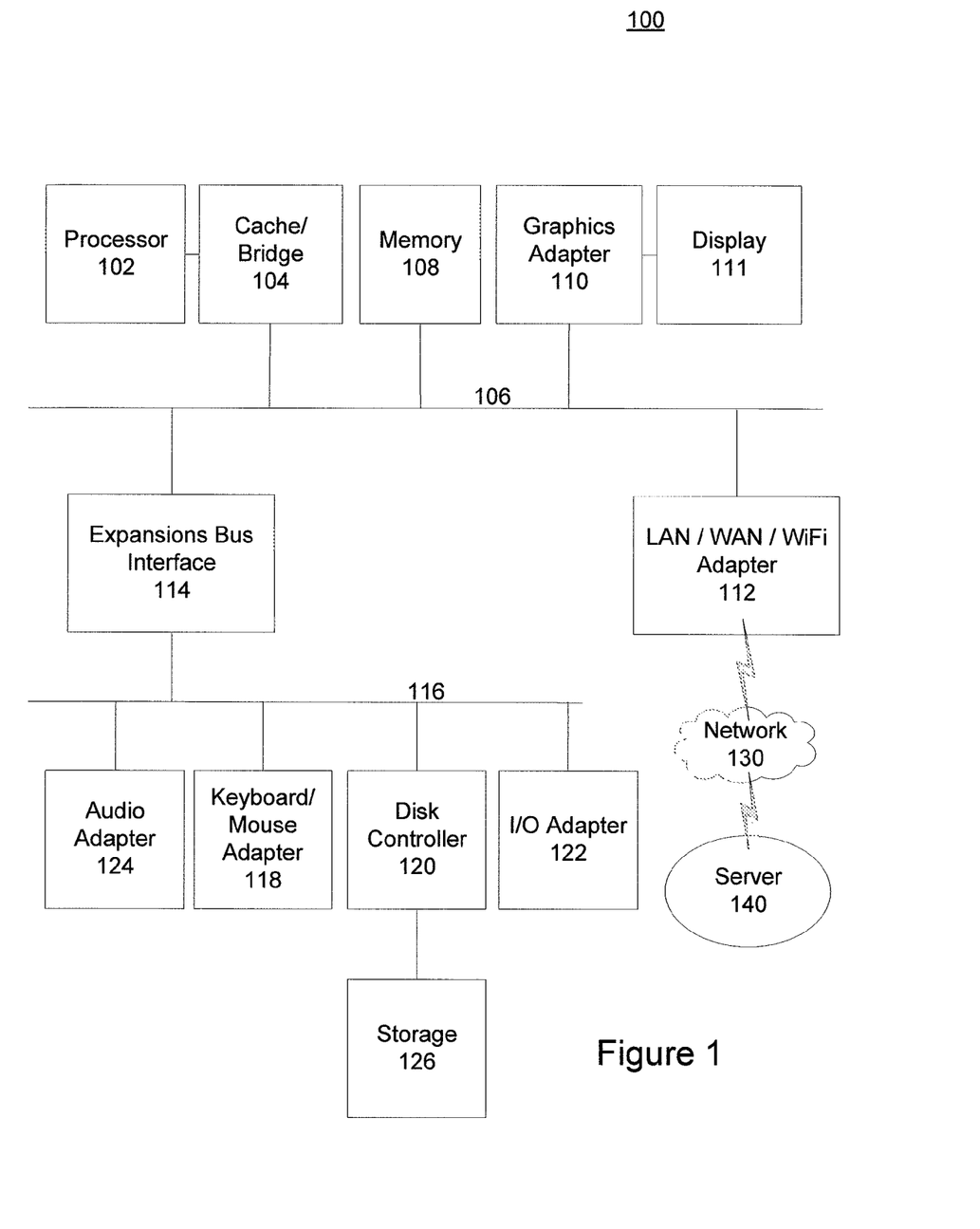
FIG. 1 depicts a block diagram of a data processing system in which an embodiment can be implemented, for example, as a CAD system.

FIG. 1 depicts a block diagram of a data processing system in which an embodiment can be implemented, for example, as a CAD system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include a CAD system and related method that maintains a relationship between a local feature and the wireframe geometry from which it is derived, even in the absence of a linear history, so that changes to either the local feature or the wireframe geometry are updated to the other.

Various embodiments provide a two-way logical coupling between feature geometry and the wireframe geometry from which the feature geometry is derived. Using this logical coupling, editing the wireframe geometry causes the feature to update, and moving the feature causes the wireframe geometry to track with the feature.

Figure 2:
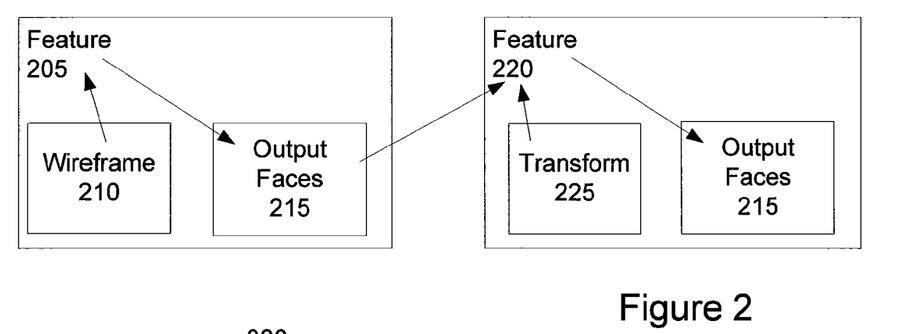
FIG. 2 illustrates an example of how changes are managed in a linear-history model in some cases.

FIG. 2 illustrates an example of how changes are managed in a linear-history model in some cases. In a linear-history model, the change flow is always one way from the wireframe to the feature to the face. In this example, history-based feature 205 includes a input wireframe 210 and a output face set 215 that is associated with wireframe 210. Face set 215 is "downstream" of prior feature wireframe 210 in the history tree. In the CAD system, in response to a user moving face set 215, the system is adding a new feature 220 to store the transformation 225 of the face set 215. A new face 230 is created and the old face set 215 is removed. Feature 205 still exists at its chronological index in linear history as maintained by the CAD system.

When a user attempts to edit the wireframe geometry of feature 205, the CAD system performs an edit of feature 205 at its defined location, not of feature 220 at its current location.

Figure 3:
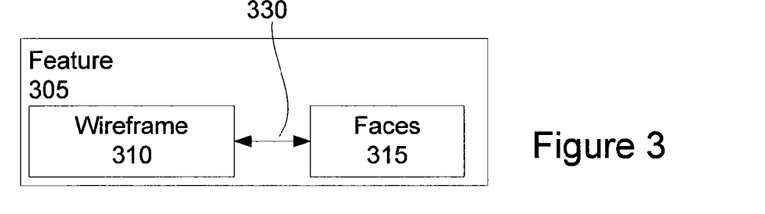
FIG. 3 depicts an example of a logical coupling of a local feature in accordance with disclosed embodiments.

FIG. 3 depicts an example of a logical coupling of a local feature in accordance with disclosed embodiments. In this figure, a local feature 305 is shown having a wireframe 310 logically coupled to a face set 315. Note that the logical coupling 330 between wireframe 310 and face set 315 is bi-directional, as opposed to the uni-directional relationship of a linear history. When a user attempts to move faces 315, the CAD system does actually edit feature 305 in that moving feature 305 moves the face set 315 and the entire feature definition. The logical coupling 330 between wireframe 310 and face set 315 ensures the wireframe geometry 210 moves in concert with the face set 315. Editing the wireframe geometry 310 of the feature means editing feature 305 at its current location, as opposed to at its prior location as in the linar history example.

A local feature with internal 2D planar wireframe geometry is conveniently autonomous. A coupling as disclosed herein causes the wireframe to affect the face and the face to affect the wireframe. FIG. 3 depicts the simplest example of such a logical coupling, as the internal wireframe geometry allows convenient management of the feature structures and the logical coupling.

The term "layout", as understood by those of skill in the art, is used both as a verb and as a noun with regard to CAD systems. In noun form, "a layout" typically connotes a collection of objects that represent high-level aspects of a design, initial framing, important locations, boundaries, or various other design parameters. The layout aids in subsequent modeling operations.

CAD users often use wireframe layout techniques as a convenience in preparation to derive multiple features. A benefit is that multiple features can be driven from the layout. This layout technique is beneficial in history-based modeling and, using techniques according to disclosed embodiments, it is equally beneficial in history-free modeling.

Figure 4:
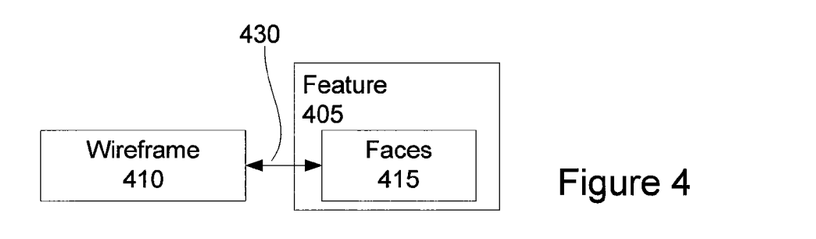
FIG. 4 depicts a further example of disclosed embodiments including a local feature having a face set logically coupled to an external wireframe geometry using a bi-directional logical coupling.

FIG. 4 depicts a further example of disclosed embodiments, including a local feature 405 having a face set 415 logically coupled to an external wireframe geometry 410 using a bi-directional logical coupling 430. Disclosed embodiments are particularly useful in such cases. In FIG. 4, bi-directional logical coupling 430 acts as a bidirectional feature-wireframe logical coupling with the wireframe 410 acting as an external layout. Wireframe 410 is maintained external to feature 405.

Figure 5:
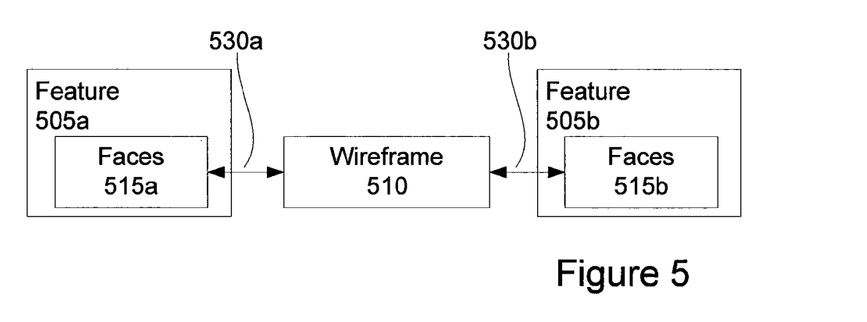
FIG. 5 depicts an example of disclosed embodiments having local features each with a bidirectional feature-wireframe logical coupling with an external layout.

FIG. 5 depicts an example of disclosed embodiments having local features 505a and 505b each with a bidirectional feature-wireframe logical coupling with an external layout. Here, the local features 505a and 505b each have a face set 515a and 515b, respectively. Wireframe 510 is maintained external to features 505a and 505b. The CAD system maintains a 2-way feature-wireframe logical couplings 530a and 530b between wireframe 510 and face sets 515a and 515b, respectively.

In each of these examples, using the bidirectional logical coupling, editing the wireframe geometry (layout) causes the feature to update, and moving the feature causes the wireframe geometry (of the layout) to track with the feature.

Another aspect of the coupling is a relation with a parent face of the feature, as depicted in the following diagram.

Figure 6:
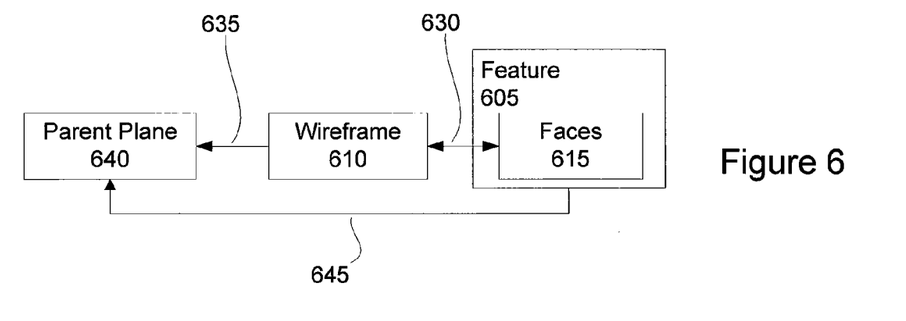
FIG. 6 depicts an example of disclosed embodiments, illustrating a local feature with relation to its parent face.

FIG. 6 depicts an example of disclosed embodiments, illustrating a local feature with relation to its parent face. Similar to FIG. 4, the local feature 605 has a face set 615. Wireframe 610 is maintained external to feature 605. The CAD system maintains a bidirectional feature-wireframe logical coupling 630 between wireframe 610 and face set 615. This figure also shows parent plane 640 as the parent of wireframe 610; as in the common case, the wireframe 610 in this example can be a 2D wireframe that exists in parent plane 640 and is logically connected by a uni-directional history relationship 635. The arrow 645 from the local feature 605 to parent plane 640 illustrates that local feature 605 is also created in parent plane 640.

A 2D layout typically begins on a single plane such as parent plane 640. As the modeling process progresses, and certainly as modifications to the model occur, the plane of the local feature 605 may no longer match the plane of the initial layout (parent plane 640). The CAD system uses the disclosed logical coupling to manage the location of the wireframe geometry in a 2D-layout manner when the parent plane and layout plane are consistent, as illustrated in the examples above.

The CAD system can also use the disclosed logical coupling to manage the location of feature 605 in a 3D spatial manner when the parent plane 640 and the layout plane of wireframe 610 are no longer consistent. When such a compromising event occurs, the CAD system uses the logical coupling to move the wireframe 610 to a layout suitable for the new location of the feature 605, adding a new layout wireframe and coupling if needed.

Figure 7:
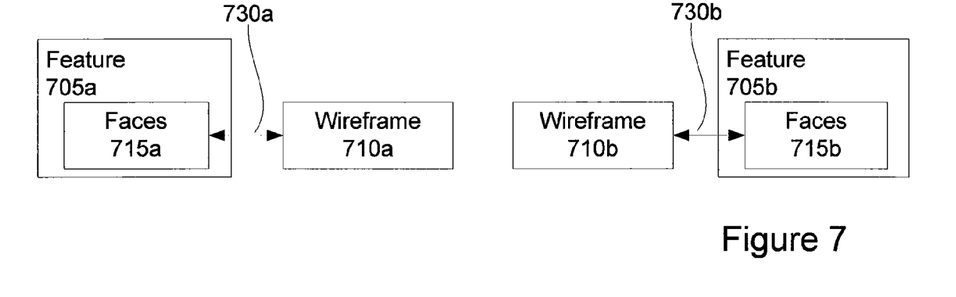
FIG. 7 illustrates a compromising event in the context of the example of FIG. 5.

FIG. 7 illustrates such a compromising event, in the context of the example of FIG. 5. If the feature 505a of FIG. 5 was moved in such a way that it was no longer consistent with the plane of wireframe 510, the system can create a new layout wireframe associated with a feature 705a. For example, after such an event, the CAD system would create new wireframe layout 710a, corresponding to wireframe 510 but in the same new plane as feature 705a and its face set 715a (these corresponding to feature 505a and face set 515a, respectively, after being moved to a new plane). The CAD system creates a new bidirectional feature-wireframe logical coupling 730a between wireframe 710a and face set 715a.

The CAD system maintains wireframe layout 710b, corresponding to and still in the same plane as wireframe 710b. The CAD system maintains the bidirectional feature-wireframe logical coupling 730b between wireframe 710b and face set 715b of feature 705b, as it was in the example of FIG. 5, where the CAD system maintained the bidirectional feature-wireframe logical coupling 530b between wireframe 510b and face set 515b of feature 505b.

That is, a when one feature is moved to a different plane, the CAD system can create from a single wireframe, such as wireframe 510, multiple wireframes in the different planes, as illustrated by wireframes 710a and 710b.

Figure 8:
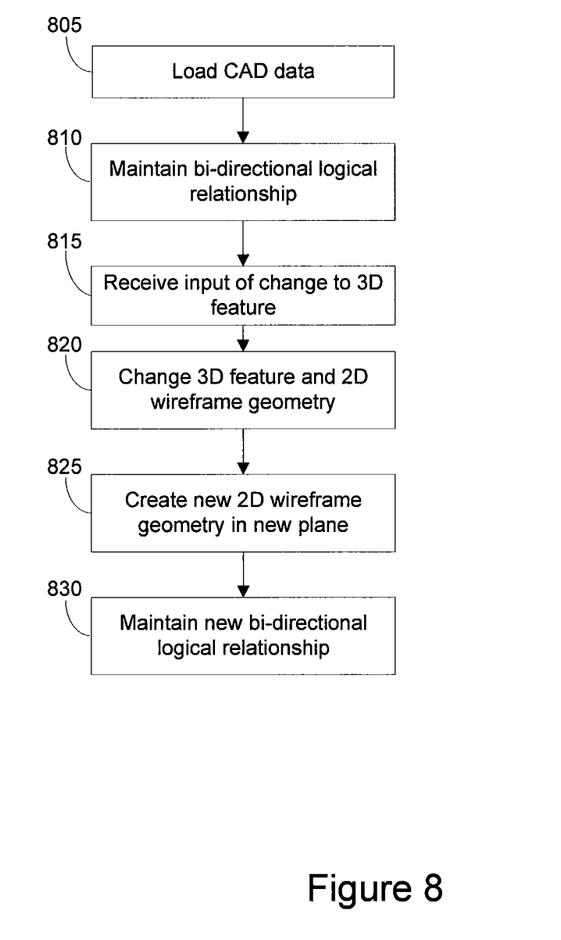
FIG. 8 depicts a flowchart of a process in accordance with disclosed embodiments.

FIG. 8 depicts a flowchart of a process in accordance with disclosed embodiments.

The CAD system loads a CAD data including a 2D wireframe geometry and 3D feature (step 805). Loading, in this context, can include loading the object model from a storage, receiving it from another data processing system, for example over a network, receiving it from a user input, or other means recognized by those of skill in the art.

In some embodiments, the CAD system can load a plurality of 3D features in step 805. The 2D wireframe geometry can be a 2D layout.

The CAD system maintains a bi-directional logical relationship between the 2D wireframe geometry and the 3D feature (step 810). In some embodiments where multiple 3D features are loaded, the CAD system maintains bi-direction logical relationships between the 2D wireframe geometry and each of the 3D features.

The CAD system receives an input of a change to the 3D feature (step 815). This input can be received directly from a user via any known user interface, over a network, or as a direction from another system or application.

In response to receiving the input, the CAD system changes the 3D feature and makes a corresponding change to the 2D wireframe geometry using the bi-directional logical relationship (step 820). These changes are stored in the CAD system and can be displayed to a user. In some cases, the process can end here. This is performed without the use of the transformation discussed above.

In some embodiments, if multiple 3D features are loaded and the user input to a first 3D feature associates the first 3D feature with a new plane, then the CAD system creates a new 2D wireframe geometry in the new plane (step 825), and maintains a new bi-directional logical relationship between the new 2D wireframe geometry and the first 3D feature (step 830), including storing these in the CAD system. The original bi-directional logical relationship between the first 3D feature and the original 2D wireframe geometry can be removed in favor of the new logical relationship with the new 3D wireframe geometry.

Those of skill in the art will recognize that not all embodiments require all steps to be performed, and that some steps can be performed in a different order or concurrently unless specifically indicated otherwise. The process of FIG. 8 can be performed by a CAD system, implemented in a CAD system particularly configured to perform such steps, and implemented by a computer-readable medium encoded with instructions that, when executed, cause a data processing system to perform such steps.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for use in a CAD system, comprising:
    loading CAD data in a CAD system, the CAD data including a first 2D wireframe geometry and a first 3D feature in a first plane;
    maintaining, by the CAD system, a first bi-directional logical relationship between the first 2D wireframe geometry and the first 3D feature;
    receiving an input of a change to the first 3D feature by the CAD system, the change including moving the first 3D feature to a second plane that is different from the first plane; and
    in response to the input, making the change to the first 3D feature and a corresponding change to the first 2D wireframe geometry by the CAD system using the first bi-directional logical relationship, and storing the changes in the CAD system, wherein making the corresponding change to the first 2D wireframe geometry includes creating a second 2D wireframe geometry, corresponding to the first 2D wireframe geometry, in the second plane, and creating a second bi-directional relationship between the second 2D wireframe geometry and the first 3D feature.

2. The method of claim 1, wherein the CAD system also loads a second 3D feature and maintains a third bi-directional logical relationship between the second 3D feature and the first 2D wireframe geometry.

3. The method of claim 1, wherein the CAD system removes the first bi-directional relationship after creating the second bi-directional relationship.

4. The method of claim 1, wherein the first 3D feature is a face set.

5. The method of claim 1, wherein the first plane is an original layout plane of the first 3D wireframe geometry, and the second plane is inconsistent with the first plane with respect to the first 3D wireframe geometry.

6. The method of claim 1, wherein the CAD system also maintains a third bi-directional logical relationship between the first 3D feature and the second 2D wireframe geometry.

7. The method of claim 1, wherein the first 2D wireframe geometry is a CAD layout.

8. A CAD system comprising a processor and accessible memory, the CAD system configured to perform the steps of:
    loading CAD data, the CAD data including a first 2D wireframe geometry and a first 3D feature in a first plane;
    maintaining a first bi-directional logical relationship between the first 2D wireframe geometry and the first 3D feature;
    receiving an input of a change to the first 3D feature, the change including moving the first 3D feature to a second plane that is different from the first plane; and
    in response to the input, making the change to the first 3D feature and a corresponding change to the first 2D wireframe geometry using the first bi-directional logical relationship, and storing the changes, wherein making the corresponding change to the first 2D wireframe geometry includes creating a second 2D wireframe geometry, corresponding to the first 2D wireframe geometry, in the second plane, and creating a second bi-directional relationship between the second 2D wireframe geometry and the first 3D feature.

9. The CAD system of claim 8, wherein the CAD system also loads a second 3D feature and maintains a third bi-directional logical relationship between the second 3D feature and the first 2D wireframe geometry.

10. The CAD system of claim 8, wherein the CAD system removes the first bi-directional relationship after creating the second bi-directional relationship.

11. The CAD system of claim 8, wherein the first 3D feature is a face set.

12. The CAD system of claim 8, wherein the first plane is an original layout plane of the first 3D wireframe geometry, and the second plane is inconsistent with the first plane with respect to the first 3D wireframe geometry.

13. The CAD system of claim 8, wherein the CAD system also maintains a third bi-directional logical relationship between the first 3D feature and the second 2D wireframe geometry.

14. The CAD system of claim 8, wherein the first 2D wireframe geometry is a CAD layout.

15. A non-transitory computer-readable medium encoded with computer-executable instructions that, when executed, cause a data processing system to perform the steps of:
loading CAD data, the CAD data including a first 2D wireframe geometry and a first 3D feature in a first plane;
maintaining a first bi-directional logical relationship between the first 2D wireframe geometry and the first 3D feature;
receiving an input of a change to the first 3D feature, the change including moving the first 3D feature to a second plane that is different from the first plane; and
in response to the input, making the change to the first 3D feature and a corresponding change to the first 2D wireframe geometry using the first bi-directional logical relationship, and storing the changes, wherein making the corresponding change to the first 2D wireframe geometry includes creating a second 2D wireframe geometry, corresponding to the first 2D wireframe geometry, in the second plane, and creating a second bi-directional relationship between the second 2D wireframe geometry and the first 3D feature.

16. The computer-readable medium of claim 15, the instructions further causing the data processing system to load a second 3D feature and maintains a third bi-directional logical relationship between the second 3D feature and the first 2D wireframe geometry.

17. The computer-readable medium of claim 15, the instructions further causing the data processing system remove the first bi-directional relationship after creating the second bi-directional relationship.

18. The computer-readable medium of claim 15, wherein the first 3D feature is a face set.

19. The computer-readable medium of claim 15, wherein the first plane is an original layout plane of the first 3D wireframe geometry, and the second plane is inconsistent with the first plane with respect to the first 3D wireframe geometry.

20. The computer-readable medium of claim 15, the instructions further causing the data processing system to maintain a third bi-directional logical relationship between the first 3D feature and the second 2D wireframe geometry.

21. The computer-readable medium of claim 15, wherein the first 2 D wireframe geometry is a CAD layout.

* * * * *